Figure 1:
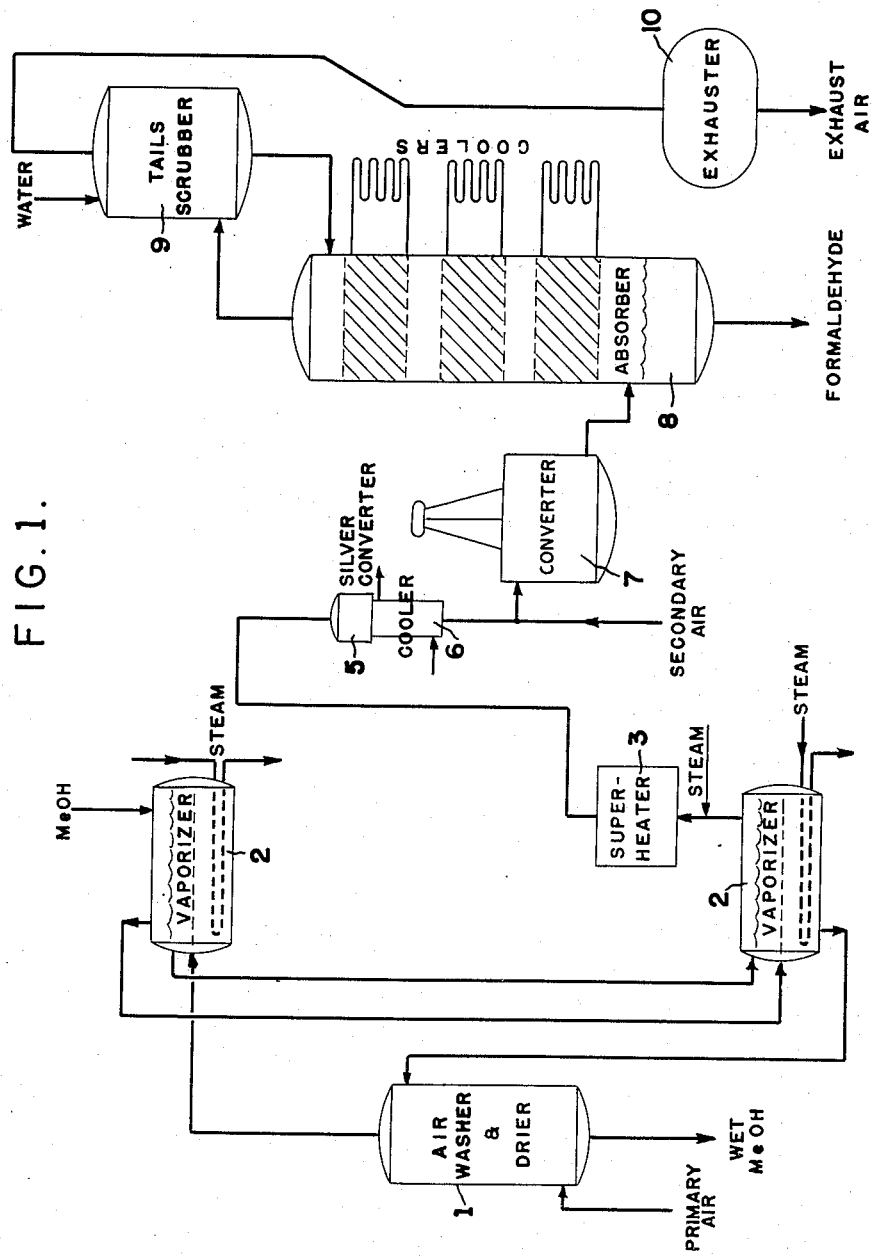

INVENTOR.
Willard A. Payne
BY
ATTORNEY

Aug. 22, 1950 — W. A. PAYNE — 2,519,788
CONVERSION OF METHANOL TO FORMALDEHYDE COMBINATION CATALYSTS
Filed Nov. 21, 1947 — 2 Sheets-Sheet 2
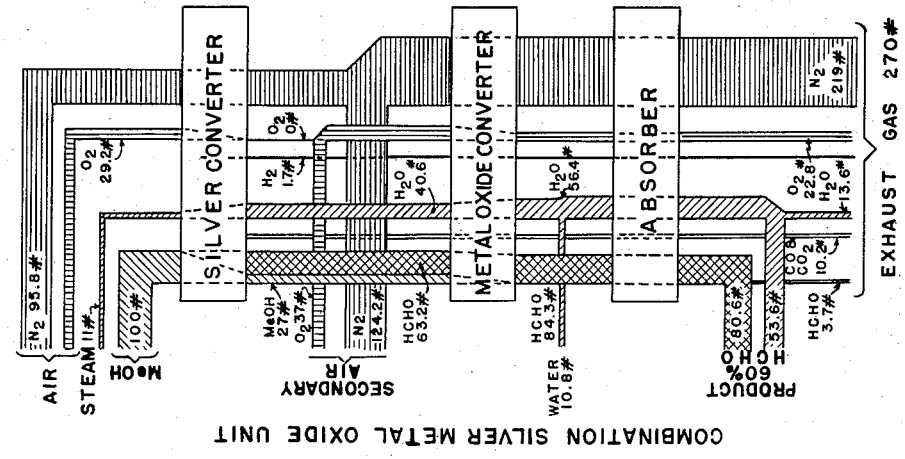
FIG. 3. COMBINATION SILVER METAL OXIDE UNIT
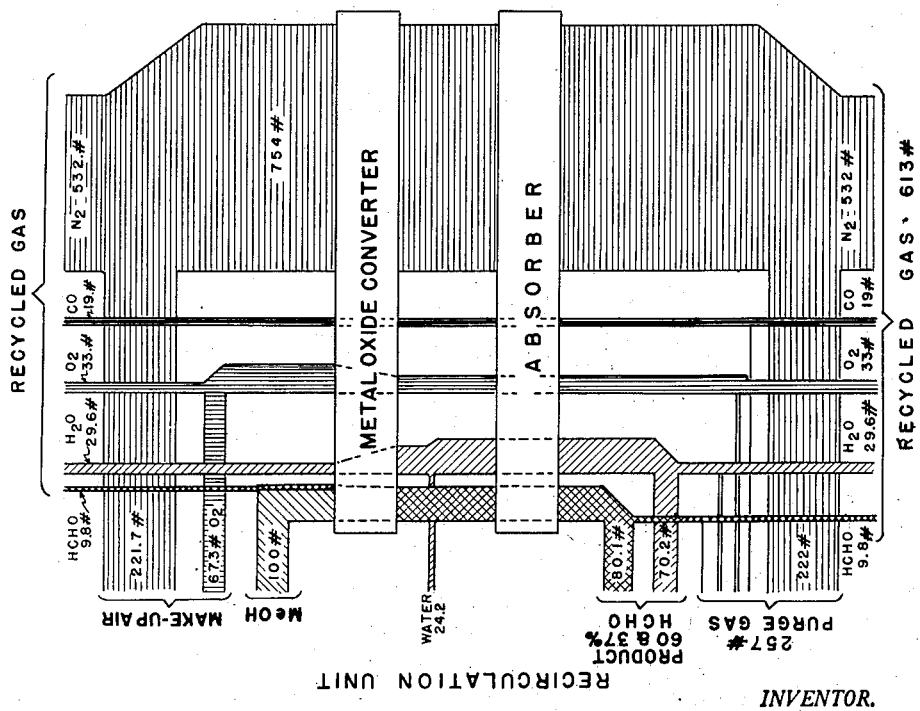
FIG. 2. RECIRCULATION UNIT
INVENTOR.
Willard A. Payne
BY
ATTORNEY Patented Aug. 22, 1950

2,519,788

UNITED STATES PATENT OFFICE 2,519,788

CONVERSION OF METHANOL TO FORMALDEHYDE COMBINATION CATALYSTS

Willard A. Payne, Charleston, W. Va., assignor to E. I. du Pont de Nemours & Company, Wilmington, Del., a corporation of Delaware Application November 21, 1947, Serial No. 787,375

12 Claims. (Cl. 260—603)

This invention relates to a process for catalytic conversion of methanol to formaldehyde and more specifically to a two step process employing oxidation and dehydration steps.

The progress made of recent years in the manufacture of formaldehyde from ethanal has been due largely to the use of efficient catalysts in conjunction with improved methods of control and engineering economics attending large scale manufacture. Two classes of catalyst, each producing a distinct type of reaction, have been used generally. They may be exemplified by a silver catalyst and a metal oxide catalyst. When the methanol to formaldehyde conversion is governed by a silver catalyst, the methanol is both oxidized and dehydrogenated to formaldehyde, as a consequence of which there is obtained with the formaldehyde a considerable amount of hydrogen and also, as this catalyst does not convert all of the methanol to formaldehyde, either by oxidation or dehydrogenation, appreciable amounts of methanol are likewise present in the product. With the metal oxide catalyst, on the other hand, the reaction is essentially oxidation and moreover, catalysts of this type have the ability to convert substantially all of the methanol to formaldehyde. In addition to the above characteristics the silver type catalysts require a very low air to methanol feed ratio usually from 1:3–1:6 to 1 which means that the size of the gas handling equipment employed is small per pound of the formaldehyde recovered, while in contrast the metal oxide type catalysts require a high air to methanol feed ratio of about 14:1 resulting in large gas handling equipment per pound of formaldehyde recovered.

From the above considerations, it is evident that each system has advantages but coupled with those advantages are disadvantages which are not present in the other system. A process that would have the advantage of both without the disadvantages of either would be a considerable advance in the art and of inestimable importance.

An object of the present invention is to provide a process having the aforesaid advantages. Another object is to provide a process for the conversion of methanol to formaldehyde in two steps, the first including a process of oxidation and dehydrogenation using a silver catalyst or an equivalent, the second including a process of oxidation using a metal oxide catalyst or an equivalent.

A further object is to provide a process wherein methanol is partially oxidized and dehydrogenated to formaldehyde over one catalyst and the unconverted methanol then oxidized over another catalyst to formaldehyde. Yet another object is to provide a continuous process for the preparation of formaldehyde from methanol wherein a mixture of methanol, air and steam is passed over a silver catalyst and the products of that reaction, including unreacted methanol, formaldehyde, water vapor and by-products are passed after introducing auxiliary air directly over a metal oxide catalyst. Still another object is to provide a process for the partial oxidation of methanol with oxygen to a gaseous mixture containing no oxygen, unconverted methanol and formaldehyde and subsequently adding oxygen to that gaseous mixture and subjecting it to a formaldehyde oxidation catalyst giving a gaseous mixture containing formaldehyde oxygen but no methanol. Other objects and advantages of the invention will appear hereinafter.

The process is illustrated with reference to the drawing which is a diagrammatic showing in cross-section of apparatus which may be used for the two step process and for the recovery of the formaldehyde in a wide range of concentrations.

Air (or other suitable oxidizing gas containing oxygen and inerts) is washed and dried by contacting with liquid anhydrous methanol in bubble plate column 1, the wet methanol being discharged to a dehydration step not shown. The moisture-free air is then substantially completely saturated with methanol in the methanol vaporizer 2, which are operated in series. The air bubbles through the methanol baths, in the vaporizers 2 which are automatically maintained at the desired temperature so as to deliver a stream of air saturated with methanol. The temperature of the methanol-air mixture thus controls the ratio of air to methanol which can be carried and for this phase of the process that ratio ranges from 0.5/1 to 2.0/1 and preferably from about 0.9/1 to 1.6/1 the preferred range requiring methanol bath temperatures of 47.4 to 40.4° C. Steam is then added to the methanol-air mixture at the exit from the second vaporizer and the resulting total mixture is heated above 50° C. in superheater 3, to insure against condensation of the methanol.

The thus superheated gaseous mixture of air-methanol and water vapor is then introduced into converter 5, which has been charged with a silver gauze or equivalent catalyst; if the former, the converter, is packed with a number of sheets of fine silver gauze which may range from 10 to 40 U. S. standard mesh, preferably about 20 mesh gauze. The temperature of this converter is controlled by the air to methanol ratio and is maintained between 300° and below the fusion temperature of the catalyst used with a preferred maximum catalyst temperature for a silver catalyst between 700° and 850° C.

During preferred operation, 65 to 80 percent of the methanol in the feed gases is converted to formaldehyde plus by-products. By varying the ratio of air to methanol conversions of methanol can be allowed to drop below or above these values; to do so, however, will destroy many of the unexpected and unpredictable advantages derived from the use of the two step process of the invention. (These advantages will be more fully described hereinafter.) Percentage of methanol converted to by-products ranges from about 3.5 to about 8.0 percent, increasing with increased conversions. Approximately 55% of the formaldehyde produced over the silver gauze catalyst results from oxidation of the methanol while the remaining 45% results from dehydrogenation of the methanol, although this may vary somewhat due inter alia to catalyst activity, air/methanol ratio, temperature, etc.

The reaction gases from the converter 5 are cooled below 180° C. in cooler 6 and are then transferred to the converter 7 in which has been disposed a suitable metal oxide or equivalent methanol oxidation catalyst. Prior to introduction, auxiliary air is added to the reaction gases to provide sufficient oxygen for this reaction. It is very essential that the concentration of oxygen in the gas at this point be carefully controlled so as not to produce an inflammable inlet mixture to converter 7 with too high an oxygen concentration on the one hand, or so as not to cause loss in the catalyst activity with too low an oxygen concentration leaving converter 7 on the other. It has been found that the approximate limits for this oxygen concentration are between 7 and 14 volume percent and preferably between 10 and 13.7 volume percent on a dry and organic-free basis as determined by an Orsat gas analyser. Any suitable oxidizing gas may be used, such as air, air enriched with oxygen, air diluted with nitrogen or other inert gas or gases.

Not only is the oxygen concentration in converter 7 feed mixture of utmost importance but in addition the methanol concentration of this mixture should preferably be held within prescribed limits. If the percent unconverted methanol from converter 5 is too high, say above 35%, then the oxygen concentration of the exit gases from the converter 7 will be too low, as a result of the oxidation of this excessive quantity of methanol and a considerable loss in catalyst activity in this converter will occur. If, on the other hand, the unconverted methanol from converter 5 is too low, say 20% or less, insufficient heat is generated in converter 7 to maintain desirable autothermal conditions and by-product formation in converter 5 will become excessive.

Expressed differently, sufficient oxidizing gas is passed into converter 5 to convert, as has been stated, from 65 to 80 percent of the methanol to formaldehyde and by-products. If less oxidizing gas is introduced there will be too much methanol left over from converter 5 to be oxidized in converter 7, i. e., the amount of oxidizing gas that under such conditions must be used in the feed to converter 7 to (1) convert all of the methanol and (2) leave an excess of oxygen to maintain the activity of the catalyst will result in a gaseous mixture that is explosive. If more oxidizing gas is used in converter 7 (i. e. to convert more than 80% methanol to formaldehyde) excessive by-products are formed. Correlation of the converted gas mixtures for optimum operations and most advantageous results limit the conversions, it has been found, in converter 5 to between 6 and 80 percent, especially when the catalysts of Example 1 are used. With other catalysts broader ranges may be employed.

Converter 7 operates with a temperature ranging between about 250 and 400° C. depending to a large extent upon the activity of the catalyst employed, activity usually decreasing with age which can be compensated for in part by a higher temperature.

The reaction gases issuing from converter 7 are fed to a formaldehyde absorber 8, where the formaldehyde which is absorbed in water may be recovered in any desired concentration.

When metal oxide catalysts sensitive to low oxygen concentrations are used, the gases issuing from converter 7 should contain oxygen, say from 3 to 9 percent, and preferably about 6.5% on an organic-free dry basis. If this is not done the catalyst appears to be reduced to such an extent that a secondary reaction predominates with the production of carbon monoxide and carbon dioxide. Unabsorbed formaldehyde vapors from absorber 8 are scrubbed in the tail scrubber 9 with water and the water-formaldehyde solution from this tail scrubber is the scrubbing medium used in absorber 8. The effluent from tail scrubber 9 is discharged to the air through exhauster 10.

Examples are here given to illustrate more specifically preferred embodiments of the process.

*Example 1.*—One hundred pounds of anhydrous methanol was vaporized with 125 lbs. (dry basis) of primary air and 11 lbs. of steam added. The mixture was heated to above 50° C., which is above the methanol dew-point, and then passed over 75 sheets of 20 U. S. standard mesh silver gauze catalyst which had been previously preheated to above 300° C. to insure light-off (initiation of the reaction).

Approximately 67.4 lbs. of the methanol was converted to formaldehyde over the silver catalyst, 5.5 lbs. to by-product oxides of carbon, and 27.1 lbs. was unconverted.

The effluent from the silver gauze converter was mixed with 160 lbs. of secondary air and the mixture then passed over a catalyst consisting essentially of molybdic oxide+iron oxide which was maintained over a temperature range of 285–350° C. by an external bath. The quantity of secondary air added plus the initial primary air (125+160 lbs.) represents an air to methanol ratio, based on the initial 100 lbs. of methanol, of 2.85:1 which is far less than the ratio of 8.5:1–14:1 utilized in conventional practice for manufacture of methanol free formaldehyde. The unconverted methanol from the silver gauze converter was essentially cleaned up over the metal oxide catalyst so that a methanol-free formaldehyde can be recovered in the subsequent scrubbing operation. Based on the overall methanol balance the composition of the effluent gases represented a conversion of 89.9 lbs. of the initial 100 lbs. of methanol to formaldehyde, 8.5 lbs. to by-products, and 1.6 lb. unconverted.

Finally, by the addition of only 10.8 lbs. of water to the tail scrubber all of the formaldehyde with the exception of that carried out in the off-gas, was recoveerd as a 60–62% solution of formaldehyde in water. None of the formaldehyde had to be recovered as a more dilute solution as is the case when an off-gas recirculation process is used where the air to methanol ratio is lowered to as low as 8.5:1. A 60% formaldehyde methanol-free solution can be produced by the conventional once through operation of the oxide catalyst but only at a considerable penalty in capacity resulting from the necessity of a gas to methanol ratio of 14 to 1.

*Example 2.*—The conditions of Example 1 were used with the exception that the 100 lbs. of methanol was vaporized with 90 lbs. of air. In this case, only 59 lbs. of the methanol was converted to formaldehyde, 3.0 lbs. to by-products, and 38 lbs. unconverted. The unconverted methanol was again cleaned up over the metal oxide catalyst and the overall conversions were essentially the same, because the large amount of methanol oxidized in converter 7 resulted in increased by-product formation in that converter.

*Example 3.*—Same conditions as in Example 1 with the exception that the 100 lbs. of methanol was vaporized with 140 lbs. of air. In this case, about 75 lbs. of the methanol was converted to formaldehyde, 8 lbs. to by-products, and 17 lbs. unconverted. The unconverted methanol was again cleaned up over the metal oxide catalyst but overall conversions of methanol to by-products was increased from the 8.5 lbs. to about 11 lbs.

For the first step of the process any suitable type of a catalyst that simultaneously oxidizes and dehydrogenates methanol to formaldehyde may be used, such as any suitable form of silver or copper.

For the second step of the process any suitable type of a catalyst that oxidizes methanol may be used such as the metal oxide catalysts, e. g. vanadium, molybdenum, magnesium, manganese, used as a metal oxide alone or together. Particularly efficient are the metal salt catalysts including the molybdenum catalysts promoted with manganese, magnesium, cadmium or an alkaline earth metal as described in U. S. application S. N. 540,738, now abandoned, the metal phosphate catalysts promoted with molybdic oxide of U. S. application S. N. 540,739; the manganese molybdates promoted with the metals of the iron group of U. S. application S. N. 675,302, now abandoned, and other equally efficient methanol oxidation catalysts.

As has been stated previously, the conversion of methanol to formaldehyde in the converter 5 is split approximately 55 to 45 percent between (1) the oxidation of methanol to formaldehyde with the formation of a mole of water and (2) a straight dehydrogenation of the methanol to formaldehyde with the liberation of hydrogen. Many practical and theoretical objections blocked the way to combining such a process with a straight oxidation process. If a combined process such as that described were used it was reasoned that the disposition of the hydrogen of the first step in the subsequent oxidizing atmosphere of the second would be of primary importance because of its influence on the oxygen requirements in that converter and also because of its influence on the water balance in the formaldehyde recovery step. The reasons against the combination appear to be most logical, viz., that the large amounts of hydrogen of step one obviously could not be economically destroyed or recovered and its oxidation to water in the second step would present highly undesirable dilution and gas ratio problems. In the presence of oxygen and at a relatively high temperature it was to be expected that the hydrogen would be oxidibed to water and additional oxygen would accordingly have to be added to the gases entering step two accompanied with the inert gas nitrogen. Furthermore, the water formed as a result of the oxidation would decrease by this amount the quantity of water that could be added to the absorber 8. The skilled chemist consequently reasoned that nothing whatsoever would be gained by a series of two step process because of the undesirable amount of additional water formed and because of the loss of hydrogen.

Moreover, in order to maintain the activity of the metal oxide catalyst it is necessary, as has been mentioned, that the gases issuing from step two contain a certain amount of oxygen. This oxygen is over and above that necessary to oxidize the methanol to formaldehyde. It was theoretically determined that if the hydrogen from step one was oxidized to water, then and in that event such a large amount of oxygen would be required to pass over the catalyst of the second step that an explosive mixture would necessarily result, which mixture cannot be tolerated in commercial practice.

Another aspect of the process deterring those skilled in the art of manufacturing formaldehyde from a combination process was the anticipated yield. It is known that formaldehyde is easily decomposed at temperatures above 200° C. so it was not to be expected that a gas containing a mixture of formaldehyde, methanol and oxygen could be passed over a metal oxide type catalyst at the high temperatures (above 300° C.) required for the oxidation of methanol to formaldehyde without simultaneously oxidizing an appreciable fraction of the formaldehyde in the gas to oxides of carbon. The overall yield to formaldehyde would in such an event, be so low as to make the process economically prohibitive since the cost of methanol is the major item in the cost of formaldehyde. A further argument used against the combination was that the silver type catalyst gave normally a 6% loss of methanol to by-products while the metal oxide type catalyst gave about an 8% loss, consequently is was expected that the unconscionable loss for both in series would be 14%. When used in series, however, a synergistic effect was realized with but 8.5% loss instead of the expected 14% loss.

For these and other reasons, it was considered by the expert of the art that a combination of the silver catalyst with a metal oxide catalyst would not be acceptable. When, however, in spite of their protestations the two-step process was carried out, a most surprising phenomenon occurred, in addition to the above outstanding results, namely, the hydrogen formed by the dehydrogenation of methanol in step one was not oxidized to water over the catalyst of step two, but passed from the latter substantially unchanged. This was a most unpredictable and unforeseeable result which wholly overcame the theoretical disadvantages which were predicted by those skilled in this art.

What has been said has to do principally with the startling improvements in operation of the two-step process over the one-step process. There is another outstanding and unforeseeable advantage resulting from a combination of the two-steps likewise outside the realm of prognostication. Modern industry uses highly concentrated formaldehyde, a solution containing as much as 60% to 62% by weight in water being employed in many processes. Generally, these processes also demand a formaldehyde containing substantially no methanol. Methanol free formaldehyde cannot be made directly and only with considerable difficulty by the use of the step-one type catalyst. When the step-two type catalyst is used alone, 60% formaldehyde can be made only by operating with 14:1 air to methanol ratio, thereby greatly reducing the capacity of the unit. If an 8.5:1 air to methanol ratio is used, via recirculation of the off-gas from the scrubber, it is not possible to produce only 60% formaldehyde because of the unfavorable water balance resulting from the inordinate amount of water recycled in the gas and plus that formed in the complete oxidation of the methanol to formaldehyde and water in the converter. For example, when the step-two catalyst is employed alone and an absorber similar to the absorber disclosed in the drawing used, it is necessary to withdraw from a central section thereof a dilute formaldehyde solution in order that a 60% solution can be made and withdrawn from the bottom of this absorber. In other words, the water balance is such in the absorption step that only a portion of the product can be produced directly in the desired concentration. There is no such limitation in the case of the combined unit. All of the formaldehyde can be produced directly as a 60 to 62% solution or weaker solution. The reasons for this more favorable water balance are two-fold. First, the process is a once-through proposition for no water vapor saturated gas is recycled. Second, about 30% of the methanol is converted to formaldehyde by dehydrogenation and this hydrogen formed is not converted to water in the subsequent oxidation reaction of the second step. This is in contradistinction to the oxidation process wherein a mole of water is formed for each mole of formaldehyde produced. It follows then that not only is it unnecessary to withdraw an intermediate concentration of formaldehyde from the absorber in order to operate the combination unit but additional water equivalent to the dehydrogenation reaction can, if desired, be added to the tail scrubber resulting in an improved formaldehyde recovery. These advantages likewise could not be predicted and are further distinguishing critical characteristics of the combined process over the process of step-one or step-two operated severally.

Another outstanding advantage emanates from combining these processes. With the silver system an air to methanol ratio of 1.3/1 is necessary, while with the metal oxide catalyst system a minimum of 8.5/1 is used. In the combined process, however, an overall air to methanol ratio of 3/1 is realized. As a direct result of this decrease in overall gas ratio either the gas handling equipment can be much smaller for a given formaldehyde production rate or as in those establishments where present equipment is converted, the formaldehyde tonnage/day rate can be increased for a given gas handling capacity.

Figures 2 and 3 illustrate diagrammatically a comparison of the gas quantities that are required to be handled per 100 lbs. of methanol treated for respectively the step-two system alone and the process of the invention. It is apparent that the saving in the amount of gas to the blowers and other equipment is quite large, the saving resulting principally from a much smaller amount of recycled nitrogen in the composite process over that necessary to recycle in the reduced catalyst process. No comparison is made with the silver system alone inasmuch as the product obtained by that system contains considerable amounts of methanol which in many instances is not desired as the contaminant and is very difficult and expensive to remove from formaldehyde.

I claim:

1. In a process for the vapor phase conversion with oxygen of methanol to formaldehyde, the improvement which comprises conducting the conversion in two steps, in the first step oxidizing and dehydrogenating a part of the methanol over a silver catalyst, and in the second step oxidizing without appreciable dehydrogenation, over a metal oxide catalyst and unconverted methanol of the first step to formaldehyde in the presence of the hydrogen from the first step and without appreciable oxidation of the hydrogen to water.

2. In a process for the vapor phase conversion with oxygen of methanol to formaldehyde, the improvement which comprises conducting the conversion in two steps, the first step being conducted by passing a mixture of methanol, oxygen and water vapor over a catalyst that both oxidizes and dehydrogenates a part of the methanol to formaldehyde and hydrogen, and in the second step passing all the products from the first step over a catalyst which oxidizes the unconverted methanol of the first step to formaldehyde without appreciable oxidation of the hydrogen to water.

3. In a process for the vapor phase conversion with oxygen of methanol to formaldehyde, the improvement which comprises partially and catalytically oxidizing methanol with an oxidizing gas over a silver catalyst, passing the reaction product with its unconverted methanol content and with added oxidizing gas over a metal oxide catalyst, where substantially all of the remaining methanol is catalytically oxidized to formaldehyde.

4. The process of claim 3 in which 65 to 80% of the methanol is converted over the silver catalyst.

5. The process of claim 3 in which the air to methanol feed to the silver catalyst has a weight ratio of from 0.5/1 to 2.0/1 and the oxygen concentration of the gaseous mixture passing over the metal oxide catalyst is between 7 and 14 volume percent on a dry and organic free basis.

6. The process of claim 3 in which the metal oxide catalyst is essentially molybdenum and iron oxides.

7. The process of claim 6 in which 65 to 80% of the methanol is converted over the silver catalyst.

8. In a two step process for the vapor phase conversion with oxygen of methanol to formaldehyde, the improvement which comprises converting a portion of the methanol in the first step over a silver catalyst and the remainder of the methanol in the second step over a metal oxide catalyst.

9. The process of claim 8 in which the air to methanol feed to the silver catalyst has a weight ratio of from 0.5/1 to 2.0/1 and the oxygen concentration of the gaseous mixture passing over the metal oxide catalyst is between 7 and 14 volume percent on a dry and organic free basis.

10. The process of claim 8 in which oxygen is added between the steps.

11. In a process for the vapor phase conversion with oxygen of methanol to formaldehyde, the improvement which comprises conducting the conversion in two steps, in the first step oxidizing and dehydrogenating a part of the methanol over a silver catalyst at a temperature between 300° C. and the fusion temperature of silver, and in the second step oxidizing without appreciable dehydrogenation the unconverted methanol of the first step to formaldehyde at a temperature between 250 and 400° C. in the presence of a metal oxide catalyst and the hydrogen of the first step, the second step being conducted without appreciable oxidation of the hydrogen to water.

12. In a process for the vapor phase conversion with oxygen of methanol to formaldehyde, the improvement which comprises conducting the conversion in two steps, in the first step air oxidizing and dehydrogenating a part of the methanol to formaldehyde by passing it over a silver catalyst at a temperature between 300° C. and the fusion temperature of silver, cooling the product from the first step, and in the second step passing the crude product of the first step with its hydrogen and unconverted methanol content and with additional air at a temperature between 250 and 400° C. over a metal oxide catalyst thereby converting the methanol to formaldehyde, the conversion being conducted without appreciable oxidation of the hydrogen to water.

WILLARD A. PAYNE.

REFERENCES CITED

The following references are of record in the file of this patent:

UNITED STATES PATENTS

| Number | Name | Date |
|---|---|---|
| 1,110,289 | Hochstetter | Sept. 8, 1914 |
| 1,851,754 | Craver | Mar. 29, 1932 |
| 1,937,381 | Bond et al. | Nov. 28, 1933 |
| 2,320,253 | Arnold | May 25, 1943 |

FOREIGN PATENTS

| Number | Country | Date |
|---|---|---|
| 2,306 of 1914 | Great Britain | Jan. 28, 1914 |

Certificate of Correction

Patent No. 2,519,788 August 22, 1950

WILLARD A. PAYNE

It is hereby certified that error appears in the printed specification of the above numbered patent requiring correction as follows:

Column 1, line 6, for "ethanal" read *methanol*; column 6, lines 5 and 6, for "oxidibed" read *oxidized*; line 14, for "series of" read *series or*; column 8, line 17, for "catalyst and" read *catalyst the*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*